United States Patent
Sohrweide et al.

(10) Patent No.: US 11,055,152 B1
(45) Date of Patent: Jul. 6, 2021

(54) SYSTEM, METHOD, AND COMPUTER PROGRAM FOR PERFORMING USER INTERFACE SYNCHRONIZATION

(71) Applicant: Amdocs Development Limited, Limassol (CY)

(72) Inventors: Deborah A. Sohrweide, San Jose, CA (US); Ksheerasagar Akella, Sunnyvale, CA (US); Manish Rustagi, Fremont, CA (US); Sanjay Gupta, Pune (IN); Amresh Vaidya, Virginia Beach, VA (US)

(73) Assignee: AMDOCS DEVELOPMENT LIMITED, Limassol (CY)

(*) Notice: Subject to any disclaimer, the term of this patent is extended or adjusted under 35 U.S.C. 154(b) by 159 days.

(21) Appl. No.: 15/866,326

(22) Filed: Jan. 9, 2018

(51) Int. Cl.
| | |
|---|---|
| *H04L 29/08* | (2006.01) |
| *G06F 9/54* | (2006.01) |
| *G06Q 30/00* | (2012.01) |
| *G06F 9/451* | (2018.01) |
| *H04L 12/58* | (2006.01) |
| *H04M 3/51* | (2006.01) |
| *G06F 9/455* | (2018.01) |

(52) U.S. Cl.
CPC .......... *G06F 9/542* (2013.01); *G06F 9/451* (2018.02); *G06Q 30/016* (2013.01); *G06F 9/45529* (2013.01); *H04L 51/046* (2013.01); *H04L 67/141* (2013.01); *H04L 67/146* (2013.01); *H04M 3/5183* (2013.01)

(58) Field of Classification Search
CPC ...... G06F 9/542; G06F 9/451; G06F 9/45529; G06Q 30/016; H04L 51/046; H04L 67/141; H04L 67/146; H04M 3/5183
USPC ........................................................ 709/203
See application file for complete search history.

(56) References Cited

U.S. PATENT DOCUMENTS

| | | | | |
|---|---|---|---|---|
| 2011/0251949 | A1* | 10/2011 | Kay ...................... | G06Q 20/10 705/39 |
| 2013/0031496 | A1* | 1/2013 | Mathrubootham ..... | G06F 3/048 715/764 |
| 2014/0282213 | A1* | 9/2014 | Musa ...................... | G06F 9/451 715/781 |
| 2015/0052067 | A1* | 2/2015 | Thiyagarajan ........ | G06Q 30/016 705/304 |
| 2017/0323279 | A1* | 11/2017 | Dion ....................... | G07F 19/20 |
| 2018/0049023 | A1* | 2/2018 | Stuber ................ | H04M 1/72522 |
| 2018/0348979 | A1* | 12/2018 | Hansbrough ........... | G06F 9/543 |

* cited by examiner

*Primary Examiner* — Aftab N. Khan
(74) *Attorney, Agent, or Firm* — Zilka-Kotab, P.C.

(57) ABSTRACT

A system, method, and computer program product are provided for performing user interface synchronization. In use, a first event occurring at a first application is identified within a system, the first event including a displaying of first information within a first user interface (UI) of the first application. Additionally, identification information associated with the first event is retrieved. Further, the first information displayed within the first UI of the first application is synchronized with second information displayed within a second UI of a second application within the system, utilizing the identification information associated with the first event.

14 Claims, 9 Drawing Sheets

SYSTEM, METHOD, AND COMPUTER PROGRAM FOR PERFORMING USER INTERFACE SYNCHRONIZATION

FIELD OF THE INVENTION

The present invention relates to data synchronization, and more particularly to communicating data between separate running applications.

BACKGROUND

The presentation of relevant information is of great benefit to many professionals, including customer service representative (CSR) agents. For example, when assisting a customer with an issue utilizing an application such as a chat service, a CSR agent may benefit from having additional relevant customer information. However, currently the data required to retrieve this additional relevant customer information needs to be manually retrieved from a separate application.

There is thus a need for addressing these and/or other issues associated with the prior art.

SUMMARY

A system, method, and computer program product are provided for performing user interface synchronization. In use, a first event occurring at a first application is identified within a system, the first event including a displaying of first information within a first user interface (UI) of the first application. Additionally, identification information associated with the first event is retrieved. Further, the first information displayed within the first UI of the first application is synchronized with second information displayed within a second UI of a second application within the system, utilizing the identification information associated with the first event.

In a first embodiment, the first application may be independent from the second application, and the first application and the second application may be running concurrently within the system.

In a second embodiment (which may or may not be combined with the first embodiment), the first UI and the second UI may both be displayed separately and concurrently within a single display.

In a third embodiment (which may or may not be combined with the first and/or second embodiment), the synchronizing may be implemented utilizing a websocket communication protocol.

DETAILED DESCRIPTION

Figure 1:
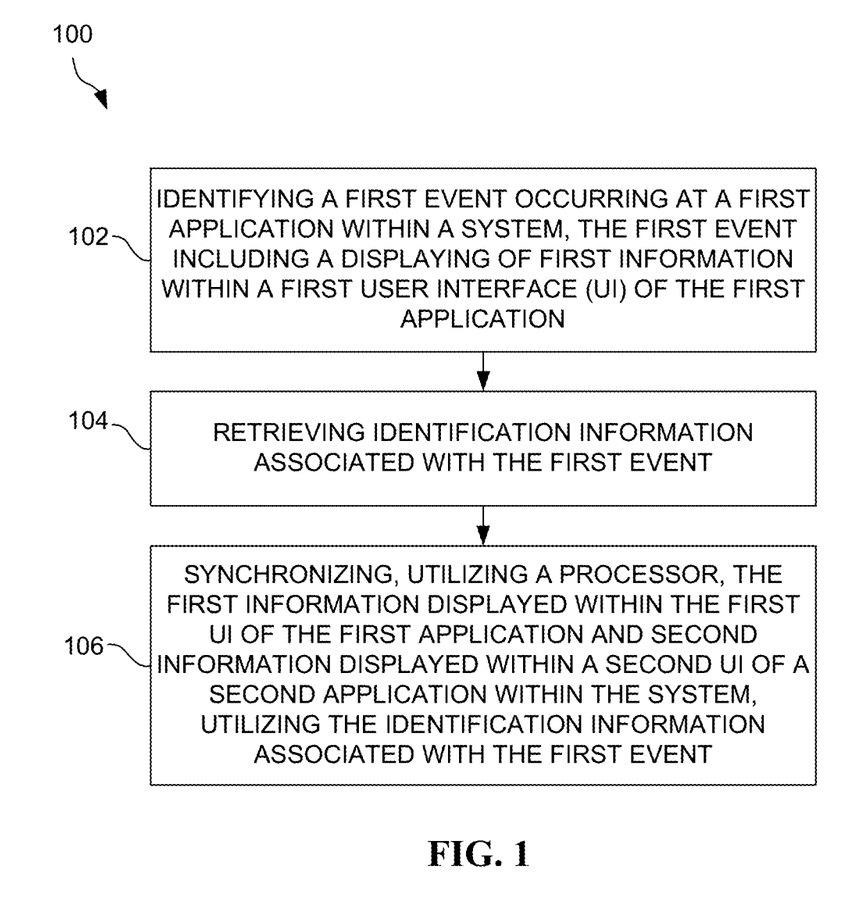
FIG. 1 illustrates a method for performing user interface synchronization, in accordance with one embodiment.

FIG. 1 illustrates a method 100 for performing user interface synchronization, in accordance with one embodiment. As shown, a first event occurring at a first application within a system is identified, where the first event includes the displaying of first information within a first user interface (UI) of the first application. See operation 102. In one embodiment, the first event may be identified in response to monitoring the first application (e.g., monitoring data flow within the first application, etc.). In another embodiment, the first application may include a customer chat application (e.g., an application that allows a user to interact with a customer via the UI of the first application).

Additionally, in one embodiment, the first event may include the receipt of a communication from a customer. For example, a customer may initiate a chat session with a user (e.g., a customer service representative (CSR) agent, etc.). In another embodiment, the first information may include chat session information such as textual, pictorial, or video content displayed within the first UI, in response to the initiation of the chat session.

Further, identification information associated with the first event is retrieved. See operation 104. In one embodiment, the identification information may include metadata received by the first application during the first event. In another embodiment, the identification information may include an identification of a customer who initiated a chat session (e.g., IP address, email address, customer ID, login ID, etc.).

Further still, in one embodiment, the identification information may include an identification of an agent who is participating in the chat session (e.g., agent ID, agent name, etc.). In another embodiment, the identification information may include an identification of the chat session (e.g., chat session ID, etc.). In yet another embodiment, the identification information may also include details of the event (e.g., a current duration of the event, a time the event was initiated, a geographical location of the customer, a geographical location of the agent, etc.).

Also, the first information displayed within the first UI of the first application and second information displayed within a second UI of a second application are synchronized within the system, utilizing the identification information associated with the first event. See operation 106. In one embodiment, the first application is independent from the second application. For example, the first application may execute and run separately from the second application. In another example, the first application and the second application may each be self-contained applications.

In addition, in one embodiment, the first application and the second application may run concurrently within the system. In another embodiment, the first UI and the second UI may both be displayed separately and concurrently within a single display. In yet another embodiment, the first information may be currently displayed within the first UI, and the second information may be currently displayed within the second UI.

Furthermore, in one embodiment, the second application may include a customer relationship management (CRM) application (e.g., an application that accesses and provides information about customers to a CSR agent). In another embodiment, the second application may have access to data that is not accessible by the first application (e.g., secure customer data, personalized non-public data, etc.).

Further still, in one embodiment, the synchronizing may include sending the identification information associated with the first event to the second application. In another embodiment, the synchronizing may include prompting the second application to display the second information within the second UI. For example, the second information may include one or more details of a customer who initiated the chat session (e.g., a browser type, an operating system, a geographical location, an address, a phone number, etc.).

Also, in one embodiment, the second information may include information associated with the customer. For example, the second information may include open orders linked to the customer, open cases linked to the customer, etc. In another embodiment, the second information may include one or more actions to be performed for the customer (e.g., view details of a customer bill, pay a customer bill, etc.).

Additionally, in one embodiment, the second information may be retrieved by the second application, utilizing the identification information. For example, the second application may automatically query a database for information associated with the identification information. In another embodiment, this database may be accessible by the second application (but not the first application).

Further, in one embodiment, the synchronizing may be implemented utilizing a websocket communication protocol. For example, the first application (e.g., the customer chat application) may initialize a chat bridge, which may establish a connection with a CRM websocket server at the second application (e.g., the CRM application) within the system. The first application may receive a call from a third-party (e.g., a customer, etc.) in response to a registered event (e.g., the customer initiating the chat session with a CSR agent, etc.). The call may include the identification information (e.g., event and context information for the chat session). The identification information may be transformed by the first application into a vendor neutral representation. The first application may call the chat bridge (e.g., utilizing an application programming interface (API), etc.). The chat bridge may then send the identification information in the vendor neutral representation to the second application via the CRM websocket server.

Further still, in one embodiment, a third event occurring at the first application may be identified within a system, the third event including the displaying of third information different from the first information within the first UI of the first application. For example, the third information may include information associated with another chat session initiated by another customer.

Also, in one embodiment, information associated with the third event may be identified, and the third information displayed within the first UI of the first application may be synchronized with fourth information displayed within the second UI of the second application within the system, utilizing the identification information associated with the third event. For example, the fourth information may be displayed within the second UI when the third information is displayed within the first UI, and the second information may be displayed within the second UI when the first information is displayed within the first UI.

In this way, information presented by the UI of the CRM application may be synchronized with information presented by the UI of the customer chat application. For example, as a CSR agent toggles between active chat sessions within the UI of the customer chat application, CRM information associated with the currently displayed chat session may be presented within the UI of the CRM application.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
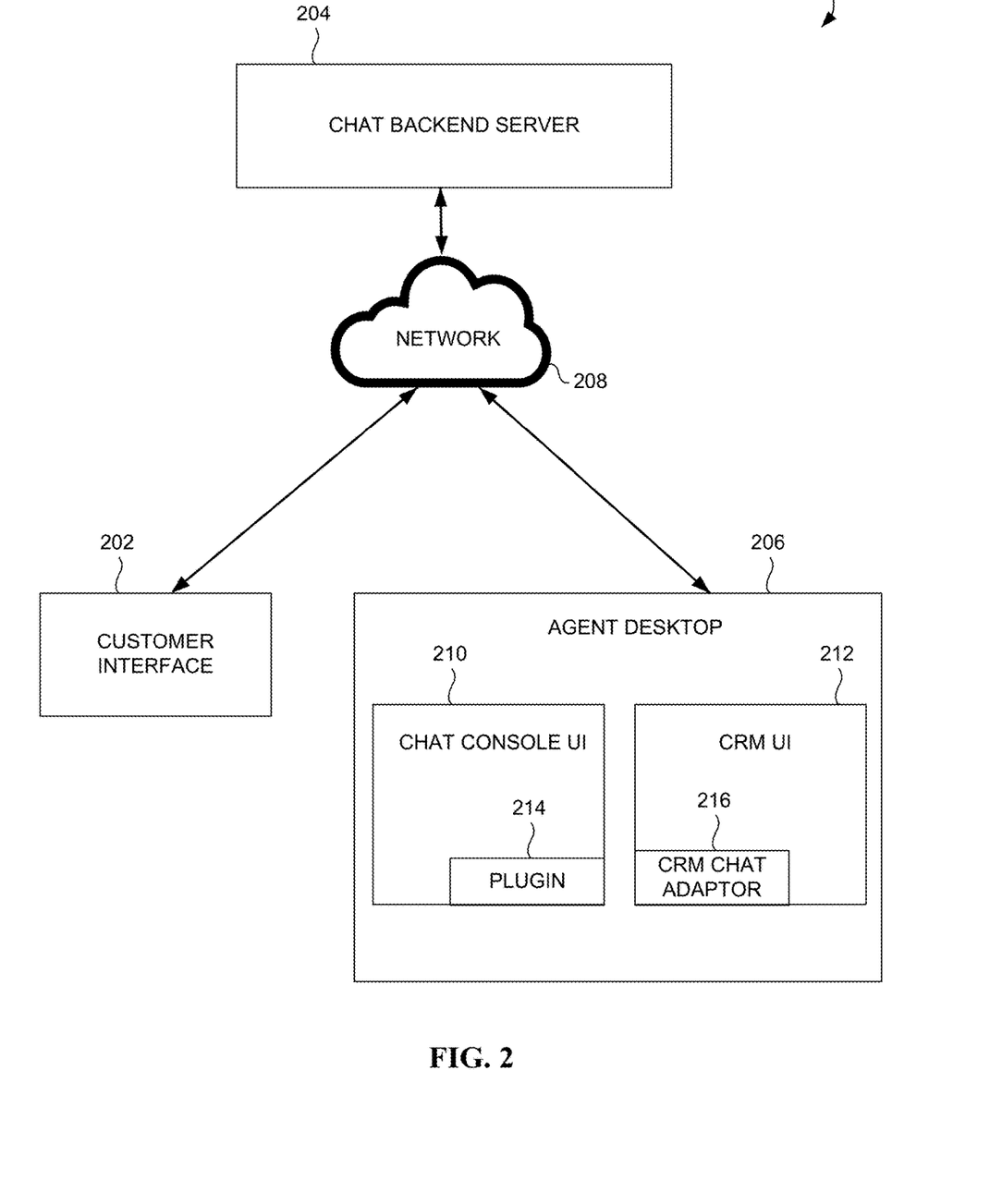
FIG. 2 illustrates an exemplary interface synchronization environment, in accordance with one embodiment.

FIG. 2 illustrates an exemplary interface synchronization environment 200, in accordance with one embodiment. As shown in FIG. 2, the environment 200 includes a customer interface 202, a chat backend server 204, and an agent desktop 206 in communication with each other via a network 208. In one embodiment, the network 208 may include the Internet.

In another embodiment, the customer interface 202 may include a web-based interface. For example, a customer may access the customer interface 202 via a web browser application from their device. Additionally, the agent desktop 206 includes visual data displayed to an agent (e.g., a customer service representative (CSR) agent, etc.). This visual data includes a chat console user interface (UI) 210 and a CRM UI 212, which are both displayed simultaneously within the agent desktop 206.

Additionally, in one embodiment, the customer may use the customer interface 202 to initiate a chat session. For example, the customer may use the customer interface 202 to send a chat session request to the chat backend server 204 via the network 208. In response to receiving the chat session request from the customer interface 202, the chat backend server 204 may initiate a chat session between the chat console UI 210 and the customer interface 202.

Further, in one embodiment, within the agent desktop 206, the chat console UI 210 and the CRM UI 212 may exchange information. For example, the chat console UI 210 may utilize a plugin 214 to communicate event information to a CRM chat adapter 216 for the CRM UI 212. In this way, when the chat console UI 210 is displaying information associated with a chat session between the chat console UI 210 and the customer interface 202 (such as chat session text, timing information, etc.), information associated with the chat session (such as a chat ID, a customer ID, an agent ID, etc.) may be sent to the CRM UI 212. In response, that the CRM UI 212 may simultaneously retrieve and display additional information associated with the chat session that is not available to the chat console UI 210 (such as customer details, associated action items, etc.).

Further still, in one embodiment, the chat console UI 210 and the CRM UI 212 may exchange control information. For example, the chat console 210 may use the plugin 214 to send event updates such as a new chat notification, an indication of a switch from one chat to another chat, and an end chat notification to the CRM chat adapter 216 of the CRM UI 212. The CRM UI 212 may then be simultaneously updated, based on the received event updates. For example, in response to receiving an indication of a switch from one chat to another chat from the chat console 210, the CRM UI 212 may retrieve and display information associated with the chat switched to by the chat console 210.

In this way, the chat console UI 210 and the CRM UI 212 may remain synchronized within the agent desktop 206 during chat sessions with a customer via the customer interface 202.

Figure 3:
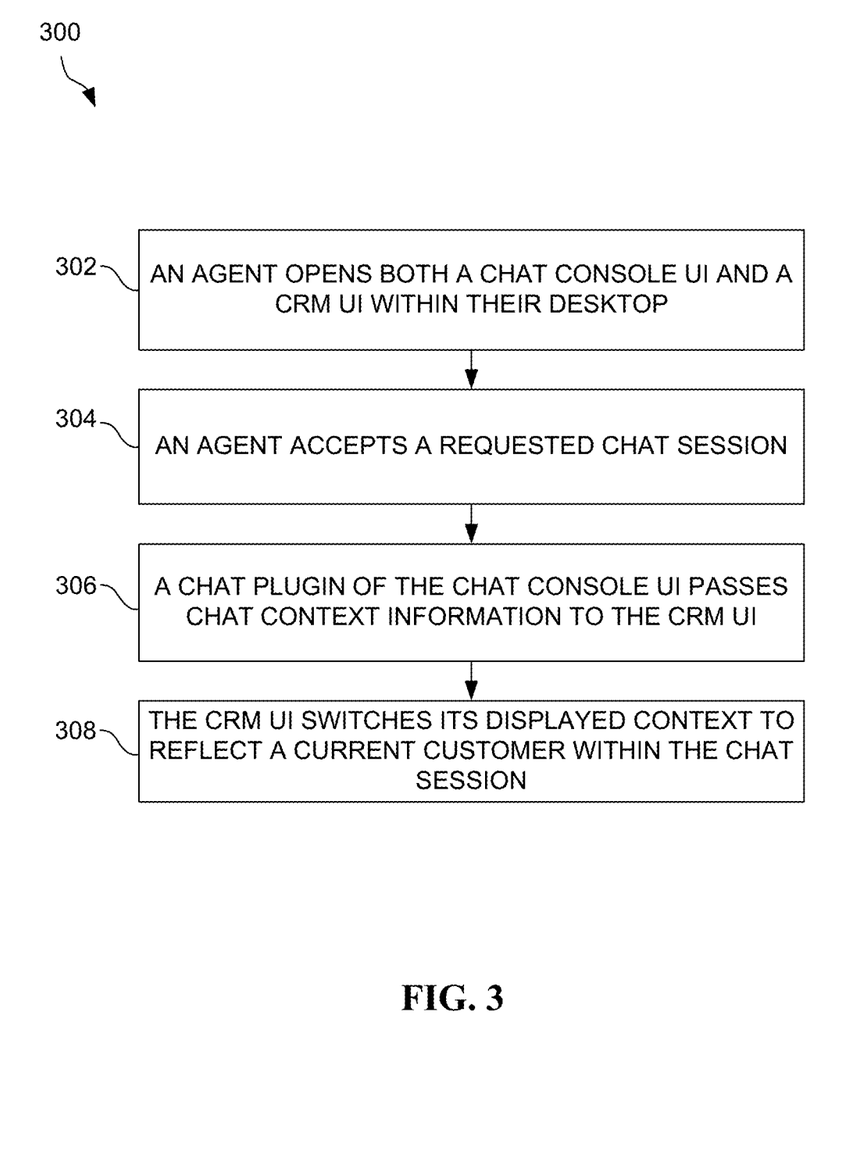
FIG. 3 illustrates a method for performing a UI synchronization process, in accordance with one embodiment.

FIG. 3 illustrates a method 300 for performing a UI synchronization process, in accordance with one embodiment. As an option, the method 300 may be implemented in the context of any one or more of the embodiments set forth in any previous and/or subsequent figure(s) and/or description thereof. Of course, however, the method 300 may be implemented in the context of any desired environment. Further, the aforementioned definitions may equally apply to the description below.

As shown, an agent opens both a chat console UI and a CRM UI within their desktop. See operation 302. Additionally, an agent accepts a requested chat session. See operation 304. For example, the requested chat session may be initiated by a customer interface.

Additionally, a chat plugin of the chat console UI passes chat context information to the CRM UI. See operation 306. Further, the CRM UI switches its displayed context to reflect a current customer within the chat session. See operation 308. For example, the CRM may utilize the context information to request relevant data from a database accessible by the CRM (and not the chat console), and may display the relevant data utilizing the CRM UI.

Figure 4:
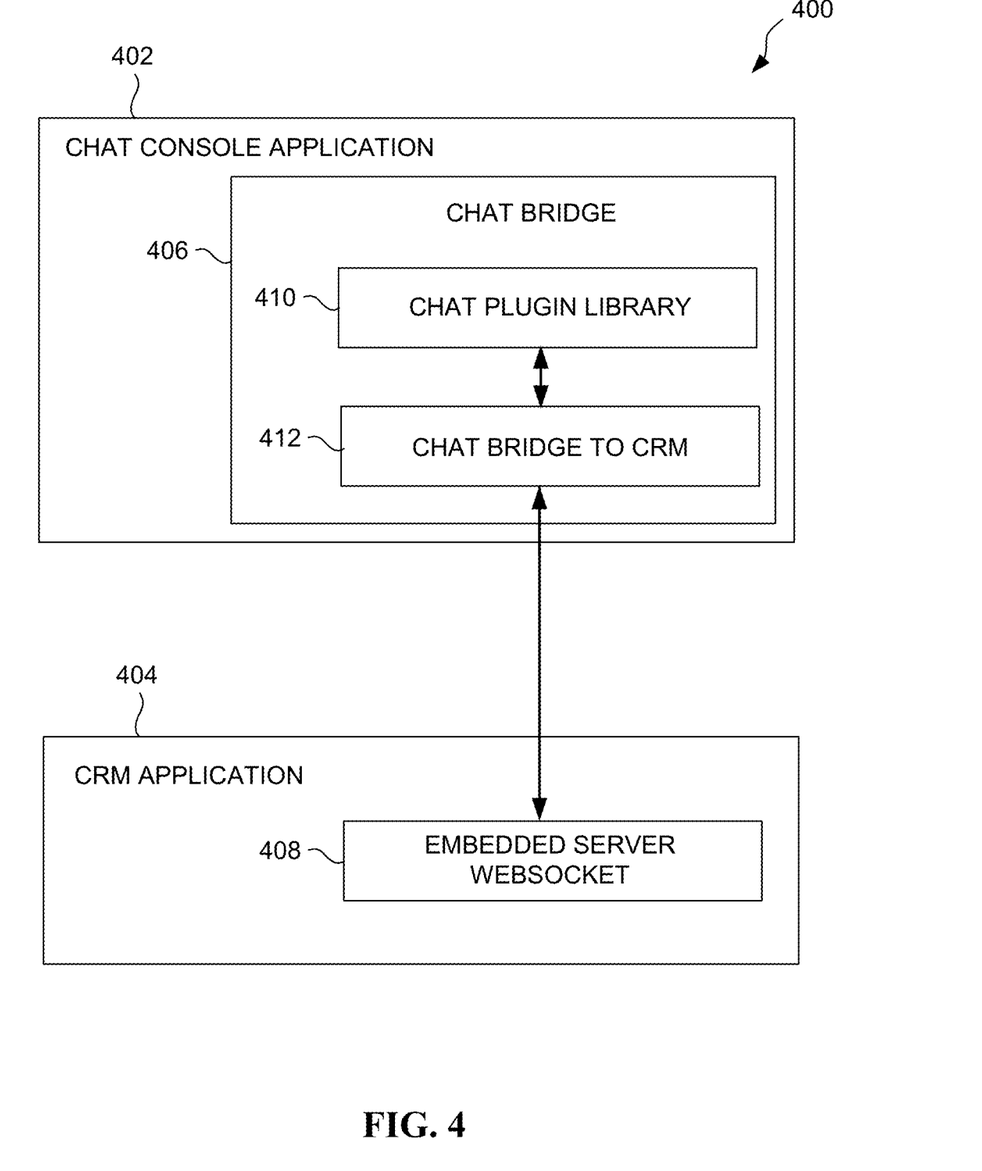
FIG. 4 illustrates an exemplary websocket communication implementation for UI synchronization between a chat console application and a CRM application, in accordance with one embodiment.

FIG. 4 illustrates an exemplary websocket communication implementation 400 for UI synchronization between a chat console application 402 and a CRM application 404, in accordance with one embodiment. As an option, the implementation 400 may be implemented in the context of any one or more of the embodiments set forth in any previous and/or subsequent figure(s) and/or description thereof. Of course, however, the implementation 400 may be implemented in the context of any desired environment. Further, the aforementioned definitions may equally apply to the description below.

As shown in FIG. 4, the chat console application 402 includes a chat bridge 406 that may be initiated by the chat console application 402 for communicating with an embedded server websocket 408 within the CRM application 404.

Additionally, in one embodiment, the chat console application 402 may receive a request to engage in a chat session with a remote customer. This request may include event and context information for the chat session that is stored in a chat plugin library 410. This event and context information may be retrieved from the chat plugin library 410 and may be transformed into a vendor-neutral representation. The chat console application 402 may also display text of the chat session within a UI of the chat console application 402.

Further, in one embodiment, the chat console application 402 may call the chat bridge to CRM 412. The chat bridge to CRM 412 may then send the vendor-neutral representation of the event and context information to the embedded server websocket 408 of the CRM application 404. Using the received vendor-neutral representation of the event and context information, the CRM application 404 may retrieve data associated with the chat session and display it utilizing a UI of the CRM application 404.

In this way, the text of the chat session displayed within the UI of the chat console application 402 may be synchronized with the data associated with the chat session displayed utilizing the UI of the CRM application 404.

Figure 5:
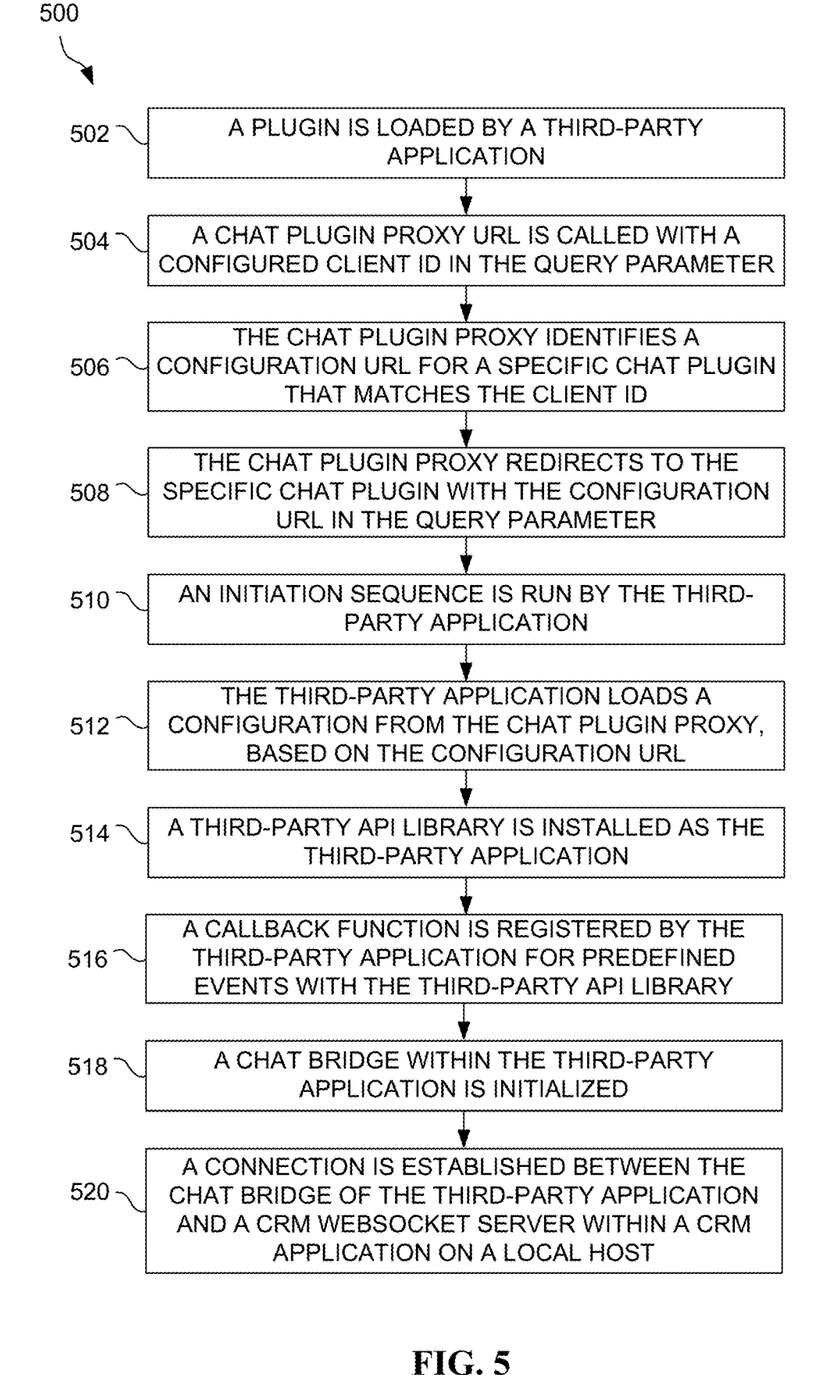
FIG. 5 illustrates a method for loading a plugin and initiating a chat bridge at a third-party application, in accordance with one embodiment.

FIG. 5 illustrates a method 500 for loading a plugin and initiating a chat bridge at a third-party application, in accordance with one embodiment. As an option, the method 500 may be implemented in the context of any one or more of the embodiments set forth in any previous and/or subsequent figure(s) and/or description thereof. Of course, however, the method 500 may be implemented in the context of any desired environment. Further, the aforementioned definitions may equally apply to the description below.

As shown, a plugin is loaded by a third-party application. See operation 502. Additionally, a chat plugin proxy URL is called with a configured client ID in the query parameter. See operation 504. Further, the chat plugin proxy identifies a configuration URL for a specific chat plugin that matches the client ID. See operation 506.

Further still, the chat plugin proxy redirects to the specific chat plugin with the configuration URL in the query parameter. See operation 508. Also, an initiation sequence is run by the third-party application. See operation 510. In addition, the third-party application loads a configuration from the chat plugin proxy, based on the configuration URL. See operation 512. Furthermore, a third-party API library is installed as the third-party application. See operation 514. Further still, a callback function is registered by the third-party application for predefined events with the third-party API library. See operation 516.

Also, a chat bridge within the third-party application is initialized. See operation 518. Additionally, a connection is established between the chat bridge of the third-party application and a CRM websocket server within a CRM application on a local host. See operation 520.

In this way, UI synchronization may be performed between the third-party application and the CRM application, utilizing the chat bridge of the third-party application and the CRM websocket server of the CRM application.

Figure 6:
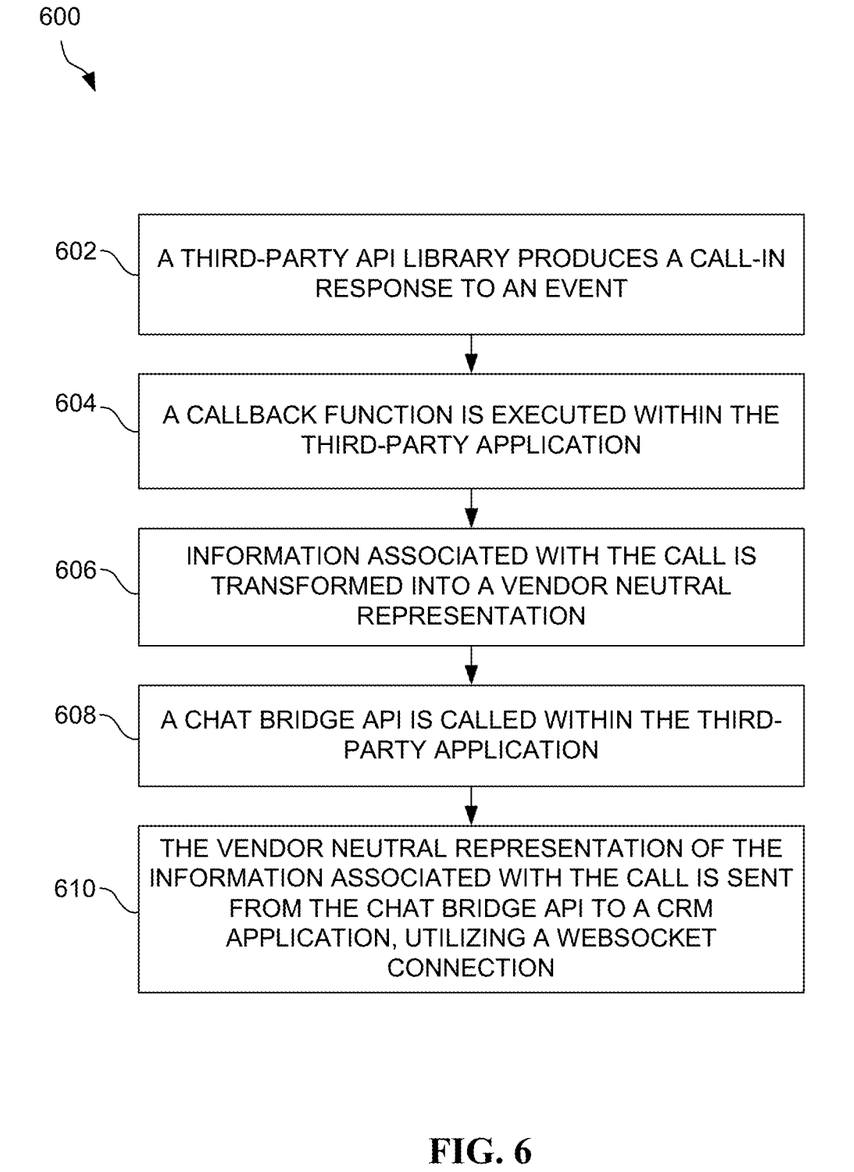
FIG. 6 illustrates a method for implementing websocket communication between a third-party application and a CRM application, in accordance with one embodiment.

FIG. 6 illustrates a method 600 for implementing websocket communication between a third-party application and a CRM application, in accordance with one embodiment. As an option, the method 600 may be implemented in the context of any one or more of the embodiments set forth in any previous and/or subsequent figure(s) and/or description thereof. Of course, however, the method 600 may be implemented in the context of any desired environment. Further, the aforementioned definitions may equally apply to the description below.

As shown, a third-party API library produces a call-in response to an event. See operation 602. For example, the event may include the initiation of a chat session, utilizing the third-party application. In another example, the call may include an event identifier as well as contextual information for the event.

Additionally, a callback function is executed within the third-party application. See operation 604. Further, information associated with the call is transformed into a vendor neutral representation. See operation 606. For example, the event identifier and the contextual information for the event may be transformed into a vendor neutral representation.

Further still, a chat bridge API is called within the third-party application. See operation 608. Also, the vendor neutral representation of the information associated with the call is sent from the chat bridge API to a CRM application, utilizing a websocket connection. See operation 610.

In this way, third-party event information may be communicated between a third-party application and a separate CRM application, such that a UI of the third-party application and a UI of the CRM application may be synchronized.

Figure 7:
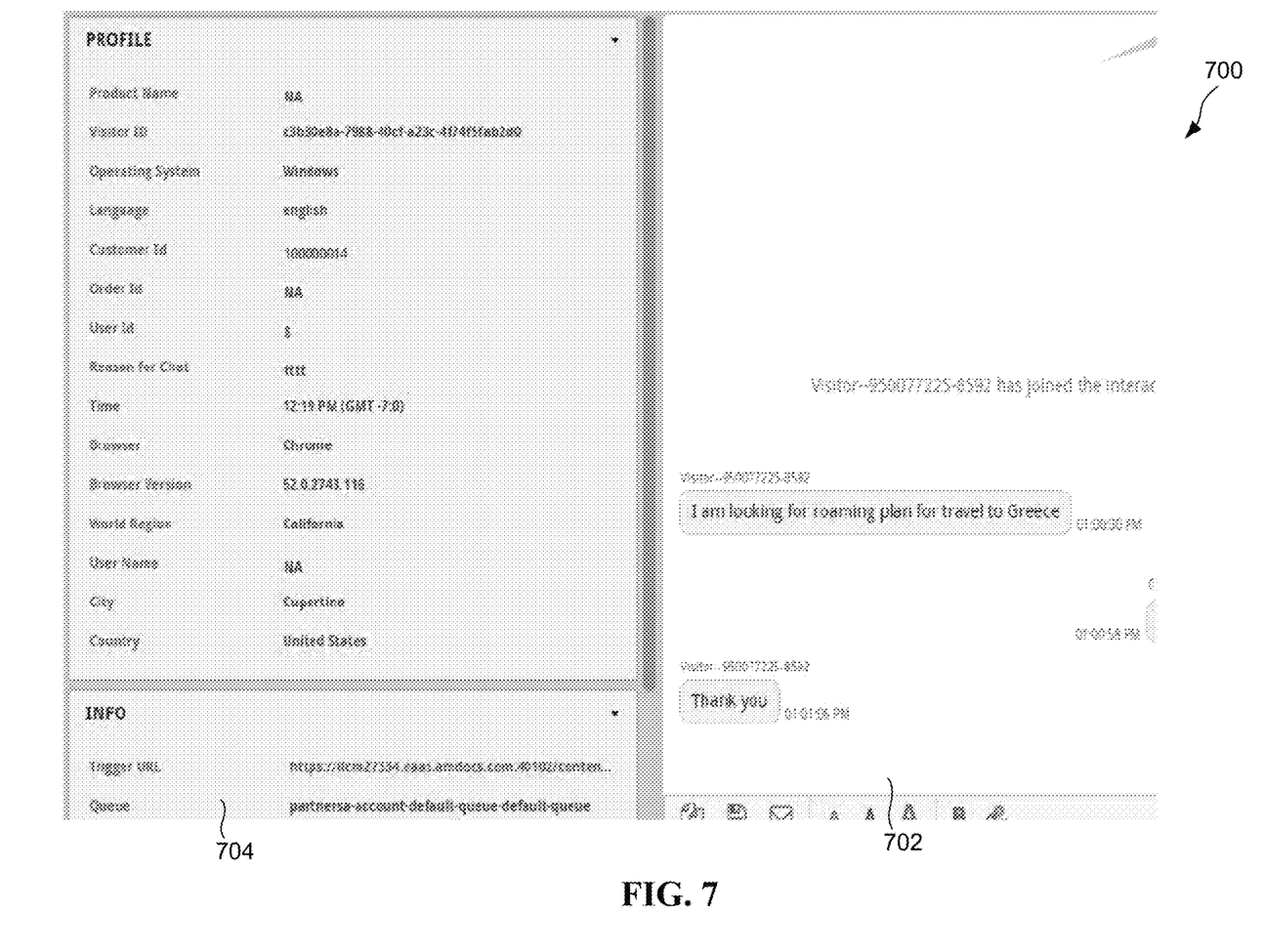
FIG. 7 illustrates an exemplary screenshot with a synchronized chat console UI and CRM UI, in accordance with one embodiment.

FIG. 7 shows an exemplary screenshot 700 with a synchronized chat console UI 702 and CRM UI 704, in accordance with one embodiment. As shown, text associated with a current chat session is displayed within the chat console UI 702. Additionally, CRM information associated with a customer involved in the chat is automatically retrieved and displayed by the CRM UI 704. In one embodiment, when an agent changes to a different chat session within the chat console UI 702, the CRM UI 704 may automatically change to display CRM information associated with a customer involved in the different chat.

In this way, CRM application may display information relevant to a current chat session concurrently with the chat session itself. This may reduce unnecessary data transfer between a CRM application and a chat application, which may increase a performance of the system. Additionally, this may eliminate the need for intermediate applications (such as screen shot applications) used to transfer information between the CRM application and the chat application, which may improve performance of the system and reduce storage used within the system.

Figure 8:
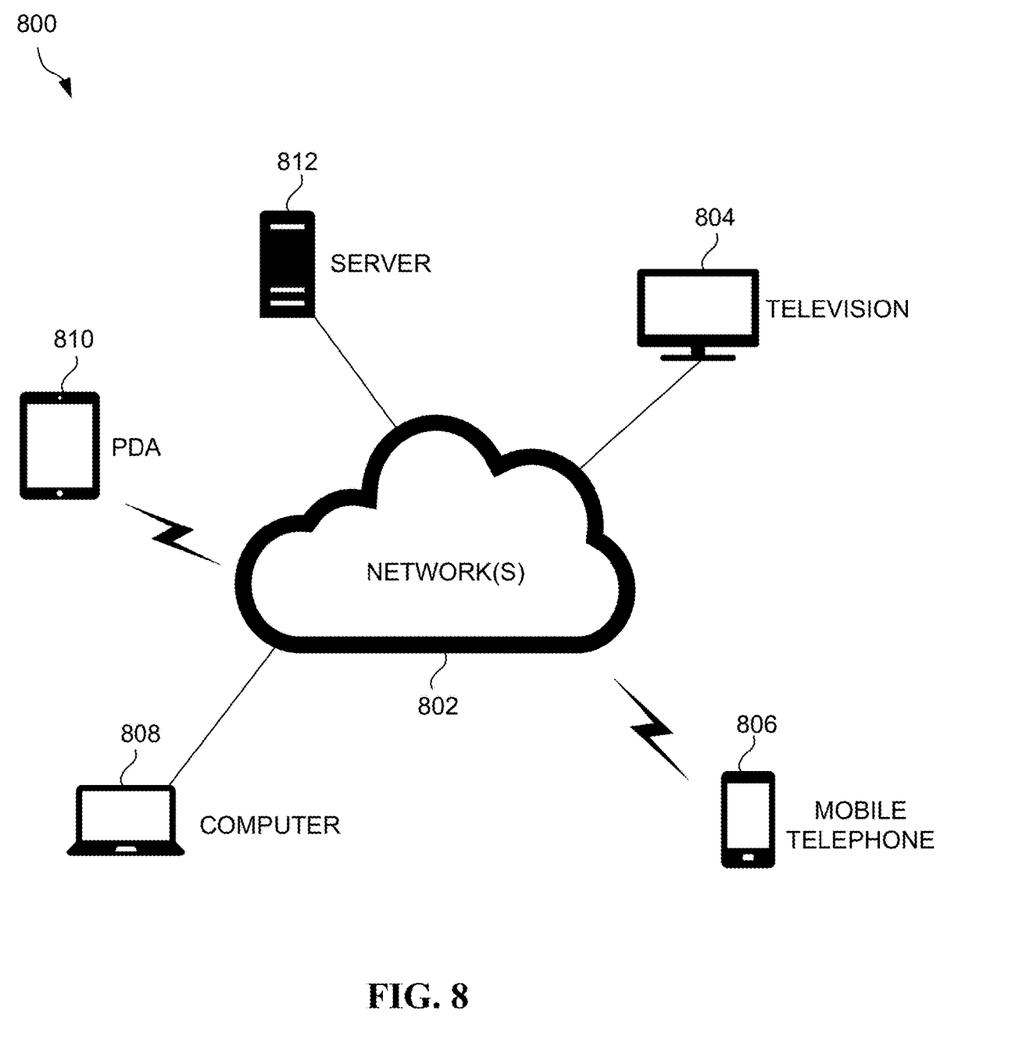
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 812 and an end user computer 808 may be coupled to the network 802 for communication purposes. Such end user computer 808 may include a desktop computer, lap-top computer, and/or any other type of logic. Still yet, various other devices may be coupled to the network 802 including a personal digital assistant (PDA) device 810, a mobile phone device 806, a television 804, etc.

Figure 9:
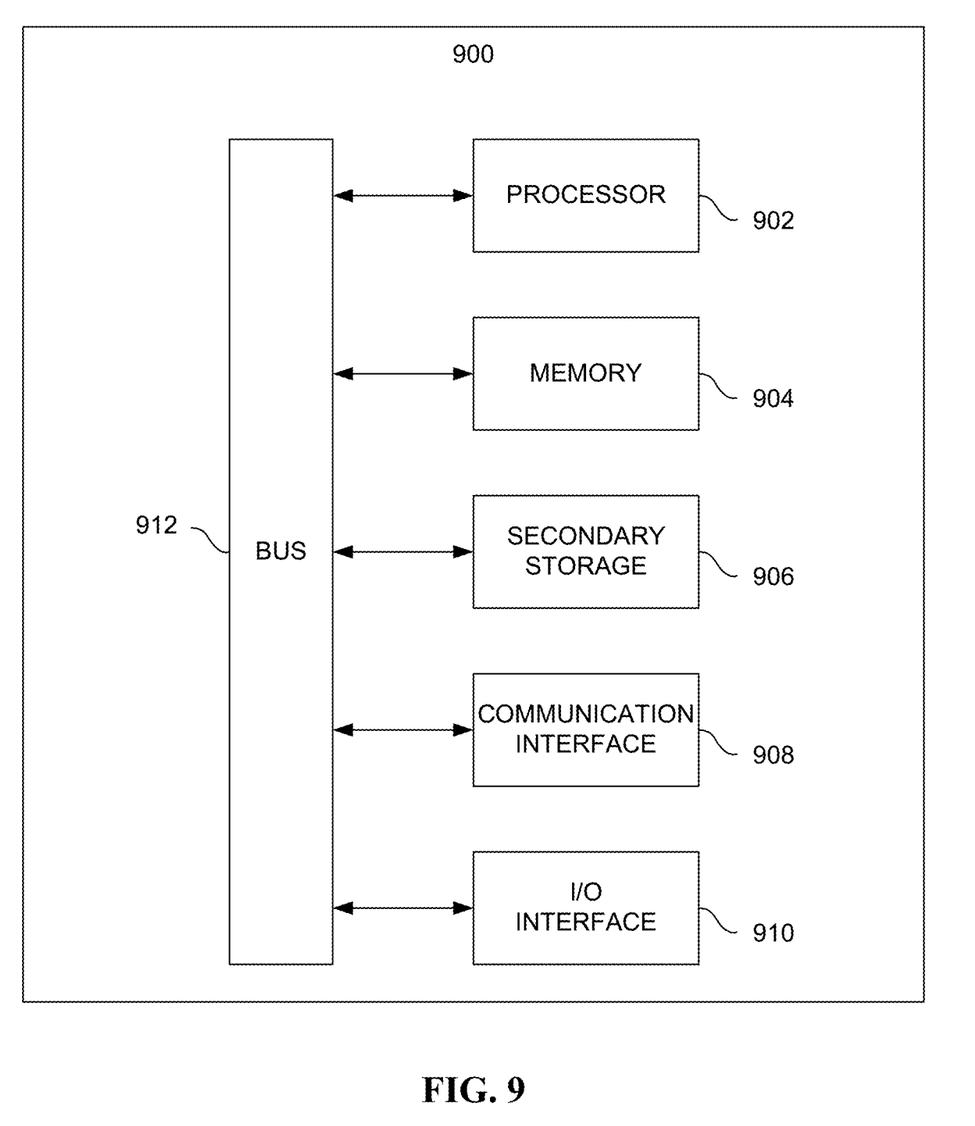
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 902 which is connected to a communication bus 912. The system 900 also includes main memory 904 [e.g. random access memory (RAM), etc.]. The system 900 also includes a graphics processor 908 and a display 910.

The system 900 may also include a secondary storage 906. The secondary storage 906 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 904, the secondary storage 906, and/or any other memory, for that matter. Such computer programs, when executed, enable the system 900 to perform various functions (as set forth above, for example). Memory 904, storage 906 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer implemented method, comprising:
    detecting, by a system, a first event occurring within a chat application executing on the system, the chat application providing a chat session between a customer device and the system and the first event being an initiation of the chat session between the customer device and the system including a displaying of first information corresponding to the initiation of the chat session within a first user interface (UI) of the chat application;
    retrieving, by the system, identification information associated with the first event, the identification information including an identifier of a customer of the customer device;
    causing, by the system, the identification information associated with the first event to be provided to a customer relationship management (CRM) application executing on the system, the CRM application having access to customer information in a database that is not accessible to the first application;
    synchronizing, by the system, the first information displayed within the first UI of the chat application and second information displayed within a second UI of the CRM application, utilizing the identification information associated with the first event by:
        retrieving, by the CRM application from the database associated with the CRM application and not accessible to the first application, the second information based on the identification information associated with the first event, and
        displaying the second information within the second UI of the CRM application,
            wherein the second information includes customer details.

2. The computer implemented method of claim 1, wherein the chat application is independent from the CRM application, and the chat application and the CRM application are running concurrently within the system.

3. The computer implemented method of claim 1, wherein the first UI and the second UI are both displayed separately and concurrently within a single display of the system.

4. The computer implemented method of claim 1, wherein the synchronizing is implemented utilizing a websocket communication protocol.

5. The computer implemented method of claim 1, wherein the first event is detected in response to monitoring a data flow within the chat application.

6. The computer implemented method of claim 1, wherein the chat session is between a customer operating the customer device and a CSR agent.

7. The computer implemented method of claim 1, wherein the first information includes chat session information including one or more of textual content, pictorial content, and video content displayed within the first UI, in response to an initiation of the chat session.

8. The computer implemented method of claim 1, wherein the identification information includes metadata received by the chat application during the first event.

9. The computer implemented method of claim 1, wherein the identification information includes an identification of the customer who initiated the chat session.

10. The computer implemented method of claim 1, wherein the identification information further includes an identification of a CSR agent who is participating in the chat session.

11. The computer implemented method of claim 1, wherein the identification information further includes an identification of the chat session.

12. The computer implemented method of claim 1, further comprising:
    detecting, by the system, a third event occurring within the chat application executing on the system, the third event including a displaying of third information different from the first information within the first UI of the chat application;

identifying, by the system, additional identification information associated with the third event; and synchronizing, by the system, the third information displayed within the first UI of the chat application and fourth information displayed within the second UI of the CRM application, utilizing the additional identification information associated with the third event;

wherein the fourth information is displayed within the second UI when the third information is displayed within the first UI, and the second information is displayed within the second UI when the first information is displayed within the first UI.

13. A computer program product comprising computer executable instructions stored on a non-transitory computer readable medium that when executed by a processor instruct the processor to:

detect a first event occurring within a chat application executing on the system, the chat application providing a chat session between a customer device and the system and the first event being an initiation of the chat session between the customer device and the system including a displaying of first information corresponding to the initiation of the chat session within a first user interface (UI) of the chat application;

retrieve identification information associated with the first event, the identification information including an identifier of a customer of the customer device;

cause the identification information associated with the first event to be provided to a customer relationship management (CRM) application executing on the system, the CRM application having access to customer information in a database that is not accessible to the first application;

synchronize the first information displayed within the first UI of the chat application and second information displayed within a second UI of the CRM application, utilizing the identification information associated with the first event by:

retrieving, by the CRM application from the database associated with the CRM application and not accessible to the first application, the second information based on the identification information associated with the first event, and displaying the second information within the second UI of the CRM application, wherein the second information includes customer details.

14. A system, comprising:

a non-transitory memory storing instructions; and one or more processors in communication with the non-transitory memory, wherein the one or more processors execute the instructions to:

detect a first event occurring within a chat application executing on the system, the chat application providing a chat session between a customer device and the system and the first event being an initiation of the chat session between the customer device and the system including a displaying of first information corresponding to the initiation of the chat session within a first user interface (UI) of the chat application;

retrieve identification information associated with the first event, the identification information including an identifier of a customer of the customer device;

cause the identification information associated with the first event to be provided to a customer relationship management (CRM) application executing on the system, the CRM application having access to customer information in a database that is not accessible to the first application;

synchronize the first information displayed within the first UI of the chat application and second information displayed within a second UI of the CRM application, utilizing the identification information associated with the first event by:

retrieving, by the CRM application from the database associated with the CRM application and not accessible to the first application, the second information based on the identification information associated with the first event, and displaying the second information within the second UI of the CRM application, wherein the second information includes customer details.

* * * * *